(12) United States Patent
Younes et al.

(10) Patent No.: US 7,047,185 B1
(45) Date of Patent: May 16, 2006

(54) METHOD AND APPARATUS FOR DYNAMICALLY SWITCHING BETWEEN SPEECH CODERS OF A MOBILE UNIT AS A FUNCTION OF RECEIVED SIGNAL QUALITY

(75) Inventors: Karim Younes, Laguna Beach, CA (US); David O. Anderton, Rancho Santa Margarita, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/153,631

(22) Filed: Sep. 15, 1998

(51) Int. Cl.
*G10L 19/00* (2006.01)

(52) U.S. Cl. ................ 704/201; 704/221; 455/524
(58) Field of Classification Search ........... 704/201, 704/270; 455/524
See application file for complete search history.

(56) References Cited

U.S. PATENT DOCUMENTS

| | | | |
|---|---|---|---|
| 5,469,471 A * | 11/1995 | Wheatley, III | 375/205 |
| 5,630,220 A * | 5/1997 | Yano | 455/234.1 |
| 5,768,308 A * | 6/1998 | Pon et al. | 370/287 |
| 5,812,968 A * | 9/1998 | Hassan et al. | 704/221 |
| 5,828,672 A * | 10/1998 | Labonte et al. | 714/708 |
| 5,855,003 A * | 12/1998 | Ladden et al. | 704/270 |
| 5,974,327 A * | 10/1999 | Agrawal et al. | 455/452.2 |
| 5,982,766 A * | 11/1999 | Nystrom et al. | 370/347 |
| 6,002,719 A * | 12/1999 | Parvulescu et al. | 340/7.21 |
| 6,073,257 A * | 6/2000 | Labonte et al. | 714/704 |
| 6,104,996 A * | 8/2000 | Yin | 704/500 |
| 6,129,513 A * | 10/2000 | Halliwell et al. | 415/173.4 |
| 6,130,577 A * | 10/2000 | Tamba et al. | 329/304 |

(Continued)

FOREIGN PATENT DOCUMENTS

| | | |
|---|---|---|
| GB | 2 322 047 A | 8/1998 |
| WO | WO 96/02091 | 1/1996 |

OTHER PUBLICATIONS

Shlomot et al,"Hybrid Coding of Speech at 4KBPS", IEEE, Jun. 1997.*

(Continued)

*Primary Examiner*—Wayne Young
*Assistant Examiner*—Michael N. Opsasnick
(74) *Attorney, Agent, or Firm*—Knobbe Martens Olson & Bear LLP

(57) ABSTRACT

A power management system for a mobile unit wherein the mobile unit detects the quality of the signals received from the base station. Based on this signal quality, the mobile unit determines if the voice data could be adequately transmitted using a secondary speech coder. If the transmission quality is adequate, the mobile unit switches from a primary speech coder to a secondary speech coder. The secondary speech coder is compatible with the primary speech coder, but consumes significantly less battery power when coding and decoding the voice data. The mobile unit may alternatively monitor the amount of processor usage. If the processor usage exceeds a threshold level, the mobile unit switches from the primary speech coder to the secondary speech coder.

26 Claims, 6 Drawing Sheets

U.S. PATENT DOCUMENTS

| | | | |
|---|---|---|---|
| 6,134,220 A * | 10/2000 | Le Strat et al. | 370/252 |
| 6,167,031 A * | 12/2000 | Olofsson et al. | 370/252 |
| 6,195,337 B1 * | 2/2001 | Nystrom et al. | 370/252 |
| 6,347,217 B1 * | 2/2002 | Bengtsson et al. | 455/67.7 |
| 6,353,666 B1 * | 3/2002 | Henderson et al. | 375/222 |
| 6,407,989 B1 * | 6/2002 | Schilling | 370/335 |
| 6,456,598 B1 * | 9/2002 | Le Strat et al. | 370/252 |
| 6,646,995 B1 * | 11/2003 | Le Strat et al. | 370/252 |
| 6,711,145 B1 * | 3/2004 | Schilling | 370/335 |

OTHER PUBLICATIONS

Diez-del Rio et al,"Secure Speech and Data Communication over the Public Switching Telephone Network", IEEE, 1994.*

Mano et al, "Design of a Pitch Synchronous Innovation CELP Coder for Mobile Communications", IEEE, 1995.*

Sigmund M. Redl et al.. "An Introduction to GSM". pp. 19-105., 1995, no month found.

* cited by examiner

METHOD AND APPARATUS FOR DYNAMICALLY SWITCHING BETWEEN SPEECH CODERS OF A MOBILE UNIT AS A FUNCTION OF RECEIVED SIGNAL QUALITY

BACKGROUND

1. Field of the Invention

This invention relates to the field of wireless communication systems. More specifically, the present invention relates to dynamically switching between speech coders.

2. Background

The use of wireless communication systems is growing with users now numbering well into the millions. One of the most popular wireless communications systems is the cellular telephone, consisting of a mobile unit (or handset) and a base station. Cellular telephones allow a user to talk over the telephone without having to remain in a fixed location. This allows users to, for example, move freely about the community while talking on the phone. However, one inconvenience associated with routine use of a cellular telephone is the constant need to recharge and replace depleted batteries in the handset.

One important service offered by wireless communication systems is speech transmission. In many analog communication systems, the voice signal is modulated and transmitted on a radio frequency carrier. In conventional digital communication systems, the voice data is typically converted to a binary bit stream and compressed prior to transmission. Converting voice data to a compressed binary stream of data consumes both battery power and processor power.

A codec is a device which transforms the voice into a digital stream of data suitable for transmission over a radio interface. Current digital wireless communications systems typically use what is called a bit-exact speech coder and decoder. Bit-exact speech coders output an exact sequence of output bits for each input signal. The predictability of the output maintains a high signal quality during the coding process. While bit-exact speech coders ensure reliable voice transmission, they do so at the expense of battery power and processor power.

Improvements in battery technology, while helpful, have not avoided the seemingly ever-present need to recharge and replace mobile unit batteries. What is needed is a system to further conserve battery power by reducing the power consumed by the mobile unit.

Moreover, wireless communications systems are becoming increasingly complex with the user having a large number of service features, such as call waiting, call forwarding, caller identification, and conference calling. While these features are desirable to the user, each active feature consumes processor power. What is needed is a system to further conserve processor power by reducing the processor usage by the mobile unit.

SUMMARY

One embodiment of the present invention is directed to reducing processor usage requirements in a mobile unit. A large amount of processor resources are consumed during speech coding and decoding by the mobile unit. Therefore, one embodiment of the invention is directed to decreasing the amount of speech coding and decoding by the mobile unit.

In one embodiment of the present invention, the mobile unit detects the quality of the signals received from the base station. Based on this signal quality, the mobile unit determines if the voice data could be adequately transmitted using an alternative speech coder. If the transmission quality is adequate, the mobile unit switches from a primary speech coder to a secondary speech coder. The secondary speech coder is compatible with the primary speech coder, but consumes less battery power when coding and decoding the voice data.

In another embodiment of the present invention, the mobile unit monitors the amount of processor usage. If the processor usage exceeds a threshold level, the mobile unit switches from a primary speech coder to a secondary speech coder. The secondary speech coder is compatible with the primary speech coder, but requires significantly less processor power when coding and decoding the voice data.

One embodiment of the invention is a wireless communication system comprising a base station which transmits signals and a mobile unit which receives the signals from the base station. The mobile unit contains a first speech coder and a second speech coder to encode voice data. A signal strength detector in the mobile unit determines the quality of the signals received by the mobile unit and a coder selector directs the mobile unit to switch from the first speech coder to the second speech coder when the quality of the signals exceeds predetermined levels.

Another embodiment of the invention is a method of conserving power in a wireless communication system comprising the acts of determining the quality of at least one signal received from a base station and selecting a secondary speech coder when the signal quality exceeds a predetermined value.

Another embodiment of the invention is a wireless communication system comprising a processor usage indicator which determines the loading on a processor in a mobile unit and a speech coder selector which causes the mobile unit to use a secondary speech coder when the loading on the processor exceeds a set value.

Another embodiment of the invention is a wireless communication system comprising a signal strength indicator which determines the quality of a signal received by a mobile unit and a speech coder selector which causes a mobile unit to use a secondary speech coder when the signal strength exceeds a set value.

Another embodiment of the invention is a wireless communication system comprising means for determining the quality of a signal received and means for switching from a first speech coder to a second speech coder when the signal quality exceeds a set value.

Another embodiment of the invention is a wireless communication system comprising means for determining the loading on a processor and means for switching from a first speech coder to a second speech coder when the processor loading exceeds a set value.

BRIEF DESCRIPTION OF THE DRAWINGS

These and other features and advantages of the invention will become more apparent upon reading the following detailed description and upon reference to the accompanying drawings.

DETAILED DESCRIPTION

Figure 1:
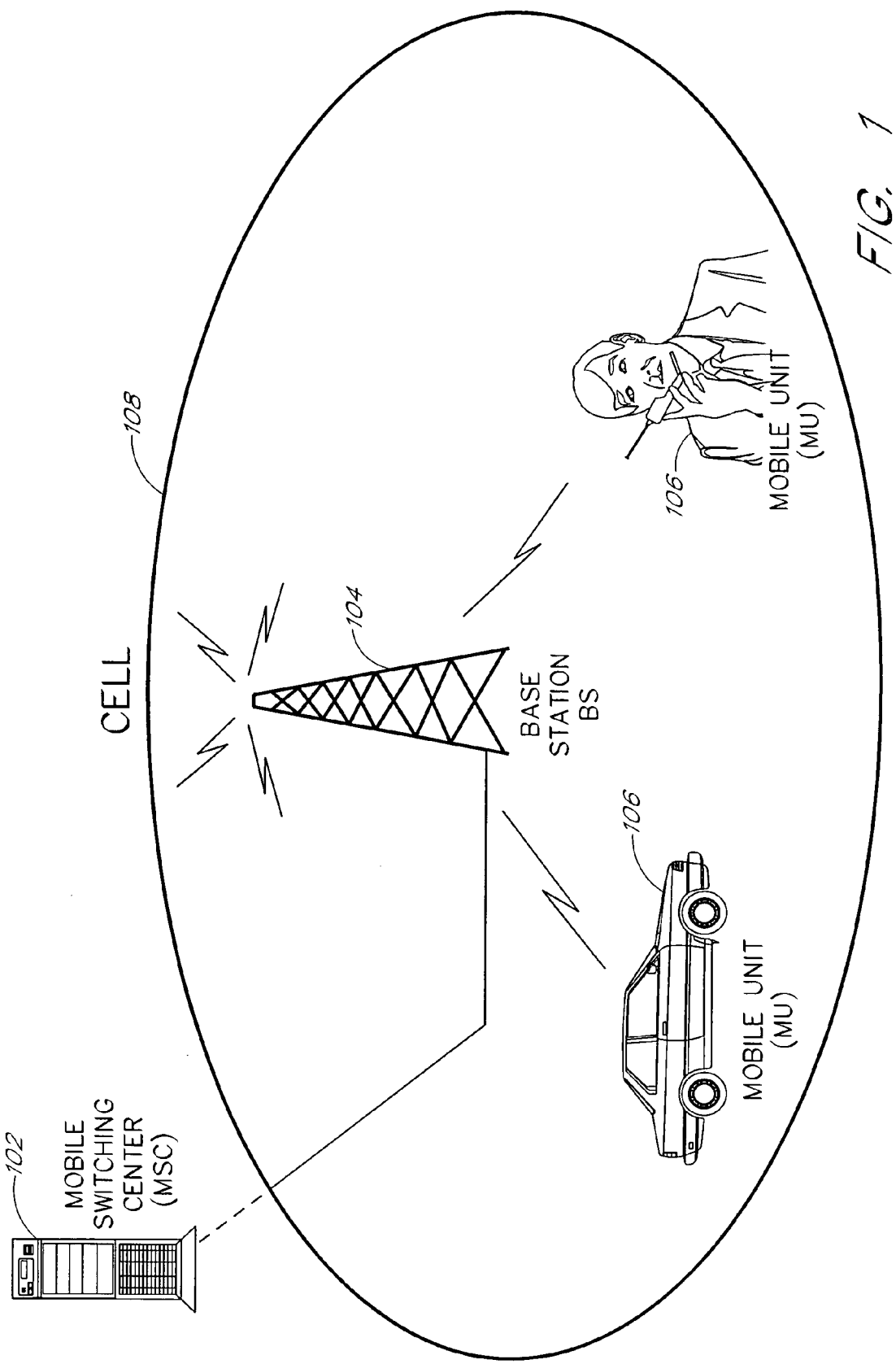
FIG. 1 illustrates components of a telephone system appropriate for use with one embodiment of the present invention.

FIG. 1 illustrates components of an exemplary wireless communication system. A mobile switching center 102 communicates with a base station 104. The base station 104 broadcasts data to and receives data from mobile units 106 within a cell 108. The cell 108 is a geographic region, roughly hexagonal, having a radius of up to 35 kilometers or possibly more.

A mobile unit 106 is capable of receiving data from and transmitting data to a base station 104. In one embodiment, the mobile unit 106 receives and transmits data according to the Global System for Mobile Communication (GSM) standard. GSM is a communication standard permitting mobile users of wireless communication devices to exchange data over a telephone system wherein radio signals carry data to and from the wireless devices.

Under the GSM standard, additional cells adjacent to the cell 108 permit mobile units 106 to cross cell boundaries without interrupting communications. This is so because base stations 104 in adjacent cells assume the task of transmitting and receiving data for the mobile units 106. The mobile switching center 102 coordinates all communication to and from mobile units 106 in a multi-cell region, thus the mobile switching center 102 may communicate with many base stations 104.

Mobile units 106 may move about freely within the cell 108 while communicating either voice or data. Mobile units 106 not in active communication with other telephone system users may, nevertheless, scan base station 104 transmissions in the cell 108 to detect any telephone calls or paging messages directed to the mobile unit 106.

One example of such a mobile unit 106 is a cellular telephone used by a pedestrian who, expecting a telephone call, powers on the cellular telephone while walking in the cell 108. The cellular telephone scans certain frequencies (frequencies known to be used by GSM) to synchronize communication with the base station 104.

The cellular telephone then registers with the mobile switching center 102 to make itself known as an active user within the GSM network.

The cellular telephone scans data frames broadcast by the base station 104 to detect any telephone calls or paging messages directed to the cellular telephone. In this call detection mode, the cellular telephone receives, stores and examines paging message data, and determines whether the data contains a mobile unit identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

Wireless communication systems use speech coding and decoding. Speech coding and decoding allows sound to be converted to a binary bit stream, transmitted across the communication systems, and be converted back to sound recognizable by the human ear.

A common implementation of the GSM system uses frequencies in the 900-MHz range. In particular, mobile units 106 transmit in the 890–915-MHz range and base stations 104 transmit in the higher 935–960-MHz range. Each 25-MHz range is divided into 125 radio frequency channels, each having a width of 200 kHz. The direction of communication from a mobile unit 106 to a base station 104 is referred to as uplink, and the direction from a base station 104 to a mobile unit 106 is referred to as downlink. Of course, the present invention is not limited to the GSM standard, and may include systems using code-division multiple access, statistical time division multiplexing, spread spectrum, a single communications channel or the like. For ease of understanding, the present invention will be described with reference to a GSM based system.

Figure 2A:
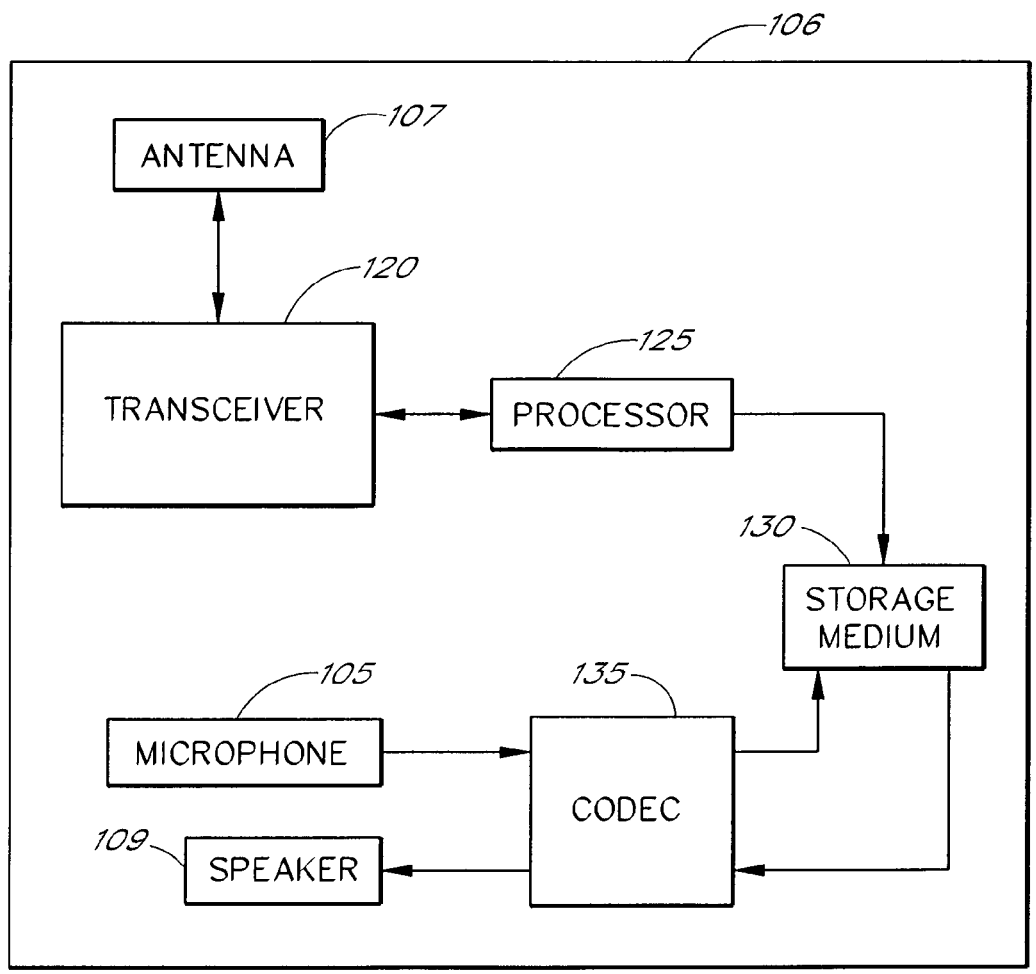
FIG. 2A illustrates a block diagram of a mobile unit according to one embodiment of the present invention.

FIG. 2A illustrates one embodiment of a mobile unit 106 according to one embodiment of the present invention. The mobile unit 106 downlinks the signals from the base station 104 at a transceiver 120 via an antenna 107. The transceiver 120 may also uplink information to the base station 104. In other embodiments, a separate receiver and transmitter may be used in place of the transceiver 120. After receiving the signals, the transceiver 120 relays the signals to a processor 125. In one embodiment, a microprocessor performs the function of the processor 125. Of course, other types of processors may be used including conventional general purpose single-chip or multi-chip microprocessors, digital signal processors, embedded microprocessors, microcontrollers and the like.

The processor 125 converts the signals into data and performs the functions requested by the signal. This may include an indication that a call is pending. The mobile unit 106 may inform the user of a pending call by a variety of methods, including ringing, vibrating or flashing lights. During the pendency of a call, the data transmitted and received by the mobile unit 106 may include voice and data.

The data created by the processor 125 may be temporarily or permanently stored in a storage medium 130. The storage medium 130 may comprise any method of storing information. For example, the storage medium 130 may comprise an electrically erasable programmable read-only memory (EEPROM), read-only memory (ROM), random access memory (RAM), hard disks, floppy disks, laser disc players, digital video devices, compact discs, video tapes, audio tapes, magnetic recording tracks, and other techniques to store data.

The data from the storage medium 130 may be transmitted through a codec (coder/decoder) 135 to the speaker 109. The codec 135 may comprise a digital-to-analog converter or the like. The decoded data may then be played through the speaker 109 to be heard by the user.

Lossy compression refers to compression techniques where the compressed data cannot be expanded into an exact copy of the original. Lossy methods deliver higher compression ratios than lossless but sacrifice the ability to reproduce the original, sound for sound. Typically, the ear does not distinguish every subtle sound. For this reason, it is permissible to discard some detail from voice data without significantly affecting the overall information content.

Bit-exact speech coders output an exact sequence of output bits for each input signal. The predictability of the output maintains a high signal quality during the coding process. Bit-exact speech coders may use either lossy or lossless compression techniques.

The user may also direct voice into the microphone 105 of the mobile unit 106. The voice data passes through the codec 135 and may be stored by the storage medium 130 prior to processing by the processor 125. The codec 135 may comprise an analog-to-digital converter or the like. The processor 125 maintains two-way communication with the transceiver 120, and therefore the voice data may be sent from the mobile unit 106 to the base station 104.

In one example, sound (voice data) is converted to an electrical signal by the microphone 105. To digitize this analog signal, it is sampled and filtered. In the present example, the signal is sampled after filtering. Every 125 microseconds, a value is sampled from the analog signal and quantized by a 13-bit word. The 125 microsecond sampling interval is derived from a sampling frequency of 8 kilohertz, which is 8,000 samples per second. Of course, other sampling frequencies may be used without departing from the spirit of the invention.

A sampling rate of 8,000 samples per second results in a data rate of 104 kbps (kilo bits per second). In one embodiment, the codec 135 further reduces the 104 kbps data rate by extracting irrelevant components in the data stream. The codec 135 searches for redundant data that can be safely removed from the bit stream scheduled for transmission over the radio path. A data reduction of 4:1 to 5:1 is common, while a data reduction of 6:1 to 8:1 is often preferred.

Figure 2B:
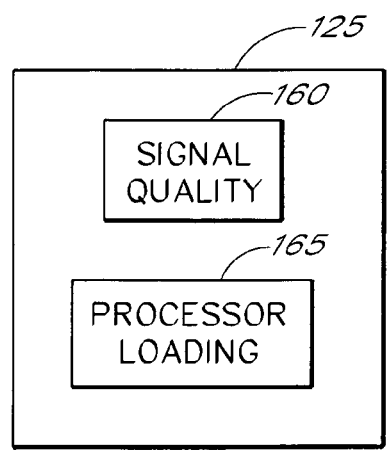
FIG. 2B illustrates a block diagram of processes performed by the processor of the mobile unit of FIG. 2A.

FIG. 2B is a block diagram illustrating several functions of the processor 125 of the mobile unit 106. In one embodiment, the processor 125 performs many of the functions of the mobile unit 106, including running the software programs necessary to communicate with the base station 104. The processor 125 may be a conventional general purpose single-chip or multi-chip microprocessor, a digital signal processor, an embedded microprocessor, a microcontroller, or any other processing device capable of executing the program instructions. The processor 125 monitors its own loading with a processor loading monitor 165. Processor loading monitors 165 are well known in the art and may operate by determining the number of instructions per second the processor 125 is executing. This informs the processor 125 how much of its capabilities is currently in use.

The mobile unit 106 also monitors the signal quality of signals received by the base station 104. This monitoring is performed by a signal quality indicator 160 in the processor 125. The signal quality indicator 160 uses a variety of indicators to determine signal quality. Among these indicators is a bit error rate, a receiver quality indicator (RX Quality), and a receive signal strength indicator (RSSI), known in the GSM and the digital cellular embodiment as RX Level. The signal quality indicator 160 uses these indicators to determine the signal quality.

In particular, the bit error rate is the number of erroneous bits in a data transmission. The RX Quality is a value assigned by the network indicating the quality of the received signal based upon the bit error rate. The RX Quality figure provides a mobile unit 106 with an expected measurement accuracy. The mobile unit 106 uses the RX Quality to determine the overall potential for error. The values assigned for RX Quality according to the GSM standard based upon the bit error rate are presented in Table 1.

TABLE 1

| RX Quality | Corresponding Bit Error Rate (%) | Range of Actual Bit Error Rate (%) | Expected MU-Reporting-Accuracy Probability (%) |
| --- | --- | --- | --- |
| 0 | Below 0.2 | Below 0.1 | 90 |
| 1 | 0.2 to 0.4 | 0.26 to 0.30 | 75 |
| 2 | 0.4 to 0.8 | 0.51 to 0.64 | 85 |
| 3 | 0.8 to 1.6 | 1.0 to 1.3 | 90 |
| 4 | 1.6 to 3.2 | 1.9 to 2.7 | 90 |
| 5 | 3.2 to 6.4 | 3.8 to 5.4 | 95 |
| 6 | 6.4 to 12.8 | 7.6 to 11.0 | 95 |
| 7 | Above 12.8 | Above 15 | 95 |

Another measurement that may be used by the mobile unit 106 is RX Level (also known as RSSI in analog systems). RX Level provides a known value based upon the measured strength of the signal at the mobile unit 106. A stronger signal at the mobile unit 106 indicates less likelihood for error. Table 2 provides values for RX Level based upon the signal strength at the mobile unit 106. Each specific value for RX Level correlates to the strength of the signal (in measured decibels (dBm)) at the mobile unit (MU) 106 receiver.

TABLE 2

| RX Level | Level at MU Receiver (dBm) |
| --- | --- |
| 0 | Less than −110 |
| 1 | −110 to −109 |
| 2 | −109 to −108 |
| ... | ... |
| ... | ... |
| 62 | −49 to −48 |
| 63 | above −48 |

Using the indications of signal quality, the mobile unit 106 can determine the probability of receiving a usable signal. The probability of receiving a usable signal is useful for determining the likelihood of receiving a usable signal if a lower quality speech coder is used. Other techniques known to one skilled in the art to measure signal quality may also be used without departing from the spirit of the invention.

Figure 3:
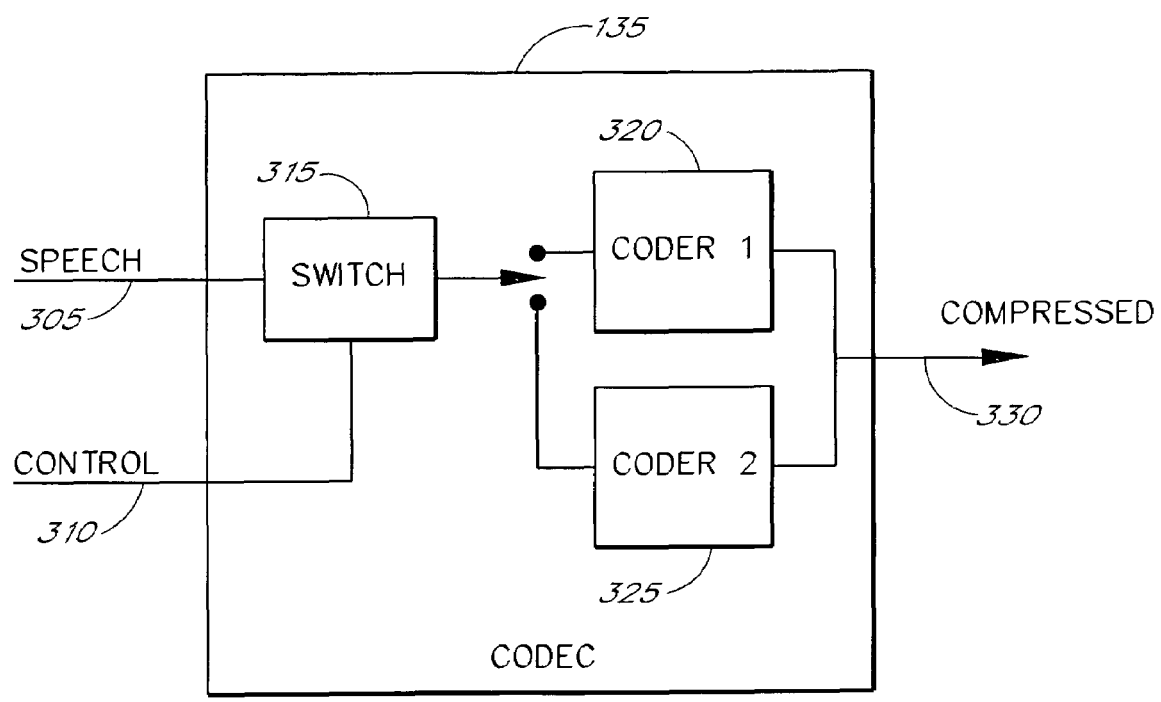
FIG. 3 illustrates a block diagram of one embodiment of the codec of the mobile unit in FIG. 2A.

FIG. 3 is a block diagram showing further features of the codec 135 in more detail. The codec 135 receives speech data on an input line 305. The speech data 305 is then sent to a switch 315 which determines whether the speech data 305 is sent to a first coder 320 or a second coder 325. The switch 315 makes the selection based upon control data 310 input to the codec 135. In one embodiment, the switch 315 is a software routine which selects the active coder. As described in further detail below, the selection may be accomplished in a variety of manners, including setting a flag indicating which coder is active or using a logic sequence to identify the active coder.

The control data 310 is generated by the processor 125. In one embodiment, the control data 310 is a binary flag indicating whether the switch 315 connects to the first speech coder 320 or the second speech coder 325. The processor 125 determines which speech coder to use based upon information as will be discussed in more detail below.

If the processor 125 selects the first speech coder 320, appropriate control data 310 is sent to the codec 135 and received by the switch 315. The switch 315 then connects to the input of the first speech coder 320 and allows the speech data 305 to be encoded and compressed by the first speech coder 320 and output from the codec 135 as encoded and compressed data 330.

Alternatively, if the processor 125 selects the second speech coder 325, then the appropriate control signal 310 is sent to the switch 315. The switch 315 then connects the speech data 305 to the second coder 325.

In one embodiment, the first speech coder 320 and the second speech coder 325 are compatible. Whether the first coder 320 or the second coder 325 is used to encode and compress the speech data 305, the speech data 330 at the output of the codec 135 may be decoded by a single decoder. This is because in one embodiment, the first speech coder 320 and the second speech coder 325 are members of a family of speech coders which can exchange compatible data. Of course, the present invention is illustrated using two speech coders. However, it can be appreciated that any number of speech coders may be used without departing from the spirit of the invention. In one embodiment, the primary speech coder is a bit-exact speech coder and the secondary speech coder is not bit-exact. However, the invention is not limited to speech coders which are bit-exact and not bit-exact. For example, in other embodiments, the primary speech coder is not bit-exact and the secondary speech coder is also not bit-exact.

Use of a bit-exact speech coder consumes more battery power and requires more processor power than a non bit-exact speech coder. For example, encoding with a bit-exact speech coder results in approximately 95% processor loading, while encoding with a related non bit-exact speech coder results in approximately 35% processor loading. This is because a bit-exact speech coder must ensure an exact sequence of bits are output for each given input. This typically requires a more complex algorithm. The bit-exact speech coder also consumes significantly more battery power. If a non bit-exact speech coder may be used without significant degradation of the signal, the processor 125 may be used to run other features and the usable life of the battery may be extended.

Figure 4:
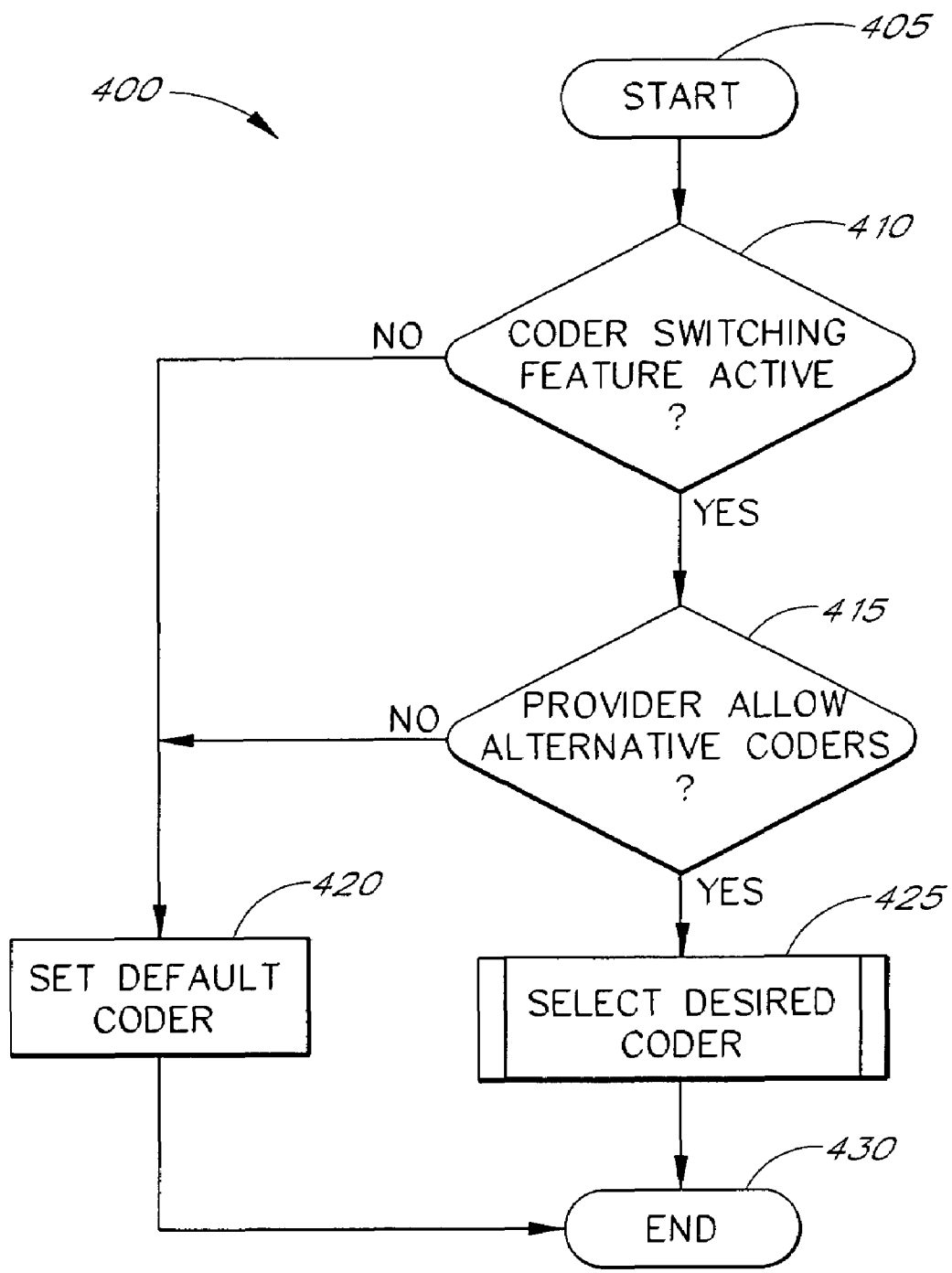
FIG. 4 illustrates acts performed by the mobile unit to select between multiple speech coders.

FIG. 4 illustrates the process 400 performed by the mobile unit 106 when selecting a speech coder. The mobile unit 106 initializes as indicated by a start block 405. Proceeding to state 410, the mobile unit 106 detects whether the coder switching feature has been activated by the user. The mobile phone may allow the user to selectively deactivate the coder switching feature and to force the mobile unit 106 to use the primary speech coder 320. Alternatively, the mobile unit 106 may further allow the user to select a fully automatic mode wherein the mobile unit 106 selects which speech coder to use. This selection process can be done, for example, with either a manual switch on the mobile unit 106 or with a software switch within the mobile unit 106.

If the coder switching feature has not been activated, the mobile unit 106 proceeds along the NO branch to state 420. In state 420, the mobile unit 106 sets the default speech coder as the primary coder. The mobile unit 106 then proceeds to an end state 430.

Returning to state 410, if the mobile unit 106 determines the coder switching feature has been activated, the mobile unit 106 proceeds along the YES branch to state 415. In state 415, the mobile unit 106 determines whether the service provider allows for alternative speech coders to be used. If the service provider of the cellular network allows for secondary speech coders to be used, the mobile unit 106 may switch to a secondary speech coder. When the mobile unit 106 initializes with the mobile switching center 102 through the base station 104, the mobile switching center 102 transmits information to the processor 125 indicating whether alternative speech coders are allowable. If the mobile switching center 102 indicates the provider does not allow for alternative speech coders, the mobile unit 106 proceeds along the NO branch to state 420. In state 420, the mobile unit 106 again sets the primary speech coder as the default coder, and then proceeds to end state 430.

Returning to state 415, if the mobile unit 106 determines the mobile switching center 102 allows for alternative speech coders to be used, the mobile unit 106 proceeds along the YES branch to state 425. In state 425, the mobile unit 106 selects the desired speech coder to be used. This selection may be performed as often as on a frame-by-frame basis. After the proper speech coder is selected in state 425, the mobile unit 106 proceeds to end state 430.

Figure 5:
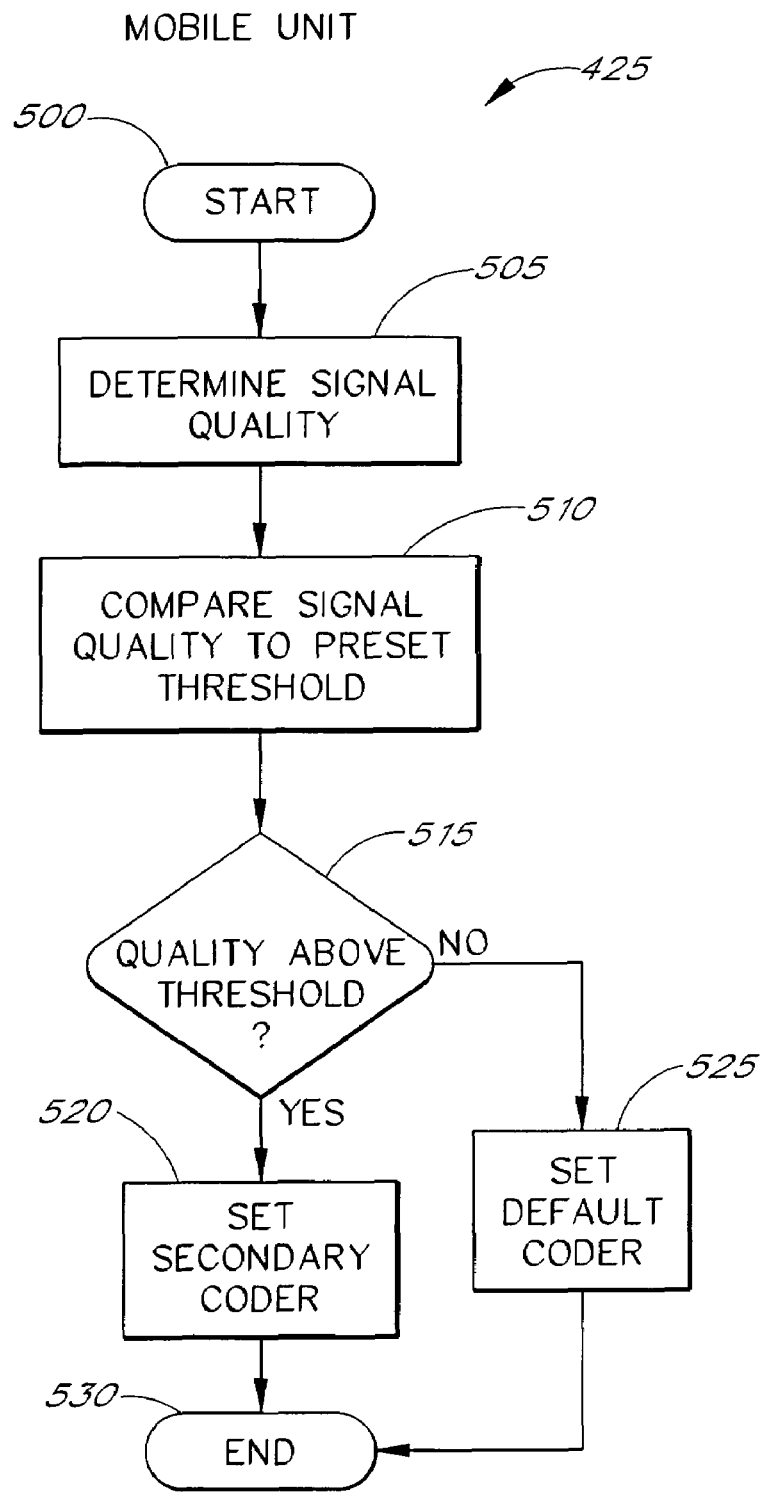
FIG. 5 illustrates acts performed by the mobile unit to select an active speech coder based upon signal quality.

FIG. 5 illustrates one embodiment of the process of state 425 to select the desired coder. The process begins at start state 500. Proceeding to state 505, the mobile unit 106 determines the signal quality of the signals received from the base station 104. Because many factors may influence the signal quality measurements, one embodiment of the invention averages several measurements of the signal quality detected by the mobile unit 106. In an alternative embodiment, the mobile unit 106 determines the signal quality on a frame-by-frame basis. Several methods of determining the signal quality of the signal received by the mobile unit 106 are discussed above with reference to FIG. 2B. These include bit error rate, a receiver quality indicator (RX Quality), and a receive signal strength indicator (RSSI), known in the GSM and the digital cellular embodiment as RX Level. The signal quality is determined by the signal quality detector 160 in the processor 125.

Proceeding to state 510, the mobile unit 106 compares the measured signal quality to a preset threshold. The signal quality threshold may be set upon the initialization of the mobile unit 106 or may be dynamically adjusted by the processor 125 based upon previous signal quality measurements. Of course, other methods of setting the signal quality threshold may be used without departing from the spirit of the invention.

Proceeding to state 515, the mobile unit 106 determines if the measured signal quality is above the preset threshold. If the signal quality is below the preset threshold, the mobile unit 106 proceeds along the NO branch to state 525. In state 525, the mobile unit 106 sets the primary coder as the default coder. In this embodiment, the primary coder may be a bit-exact speech coder to ensure the speech is properly encoded and decoded by the mobile unit 106. The mobile unit 106 then proceeds to end state 530.

Returning to state 515, if the mobile unit 106 determines the measured signal quality is above the threshold, the mobile unit 106 proceeds along the YES branch to state 520. In state 520, the mobile unit 106 sets the secondary speech coder as the operable coder. The secondary speech coder may be a non bit-exact speech coder to be used when signal quality indicates sound quality will still be acceptable using a non bit-exact speech coder. The secondary speech coder may also save power. After the mobile unit 106 sets the secondary speech coder it proceeds to end state 530.

Figure 6:
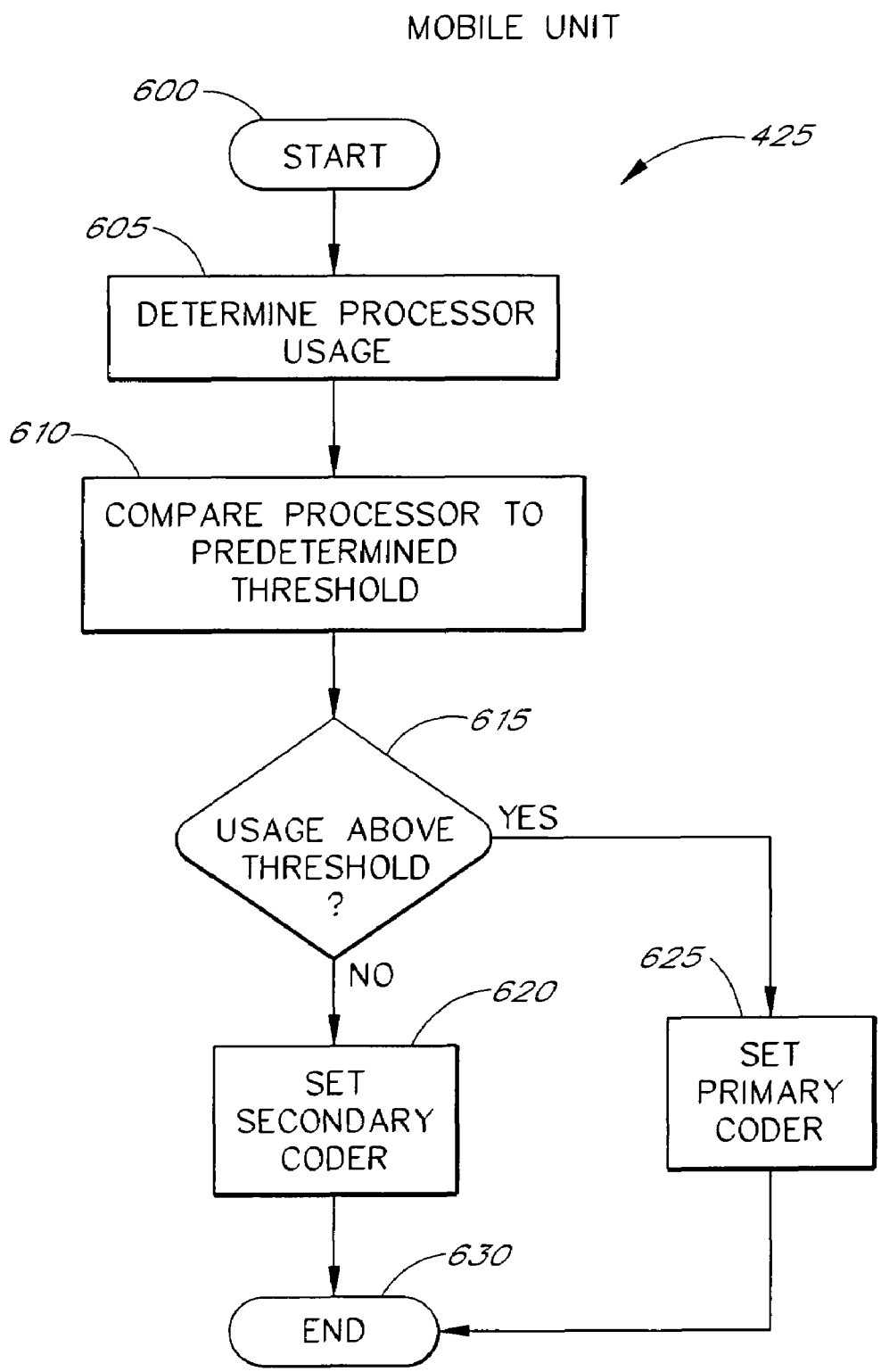
FIG. 6 illustrates acts performed by the mobile unit to select an active speech coder based upon processor usage.

FIG. 6 illustrates the process according to another embodiment with the mobile unit 106 to select the desired coder to use as indicated in state 425. The process begins at start state 600. Proceeding to state 605, the mobile unit 106 determines the processor usage of the processor 125 of the mobile unit 106. The processor usage is determined by the processor loading detector 165 in the processor 125.

Proceeding to state 610, the mobile unit 106 compares the measured processor usage to a predetermined threshold. The processor usage threshold may be set upon the initialization of the mobile unit 106 or may be dynamically adjusted by the processor 125 based upon previous usage measurements. Of course, other methods of setting the signal quality threshold may be used without departing from the spirit of the invention.

Proceeding to state 615, the mobile unit 106 determines if the measured processor usage is above the preset threshold. If the processor usage is not above the preset threshold, the mobile unit 106 proceeds along the NO branch to state 625. In state 625, the mobile unit 106 sets the primary coder as the default coder. In this embodiment, the primary coder may be a bit-exact speech coder to ensure the speech is properly encoded and decoded by the mobile unit 106. The mobile unit 106 then proceeds to end state 630.

Returning to state 615, if the mobile unit 106 determines the processor usage level is above the threshold, the mobile unit 106 proceeds along the YES branch to state 620. In state 620, the mobile unit 106 sets the secondary speech coder as the operable coder. The secondary speech coder may be a non bit-exact speech coder to be used when high processor loading dictates a simpler speech coder to be used. The secondary speech coder may also save power. After the mobile unit 106 sets the secondary speech coder it proceeds to end state 630.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A wireless communication system comprising:
    a mobile unit which receives signals from a base station, the mobile unit containing a bit-exact speech coder and a non bit-exact speech coder, wherein the bit-exact speech coder is compatible with the non bit-exact speech coder, wherein the non bit-exact speech coder produces a lower quality transmit signal than the bit-exact speech coder, the mobile unit encoding voice data in a signal to transmit using either the bit-exact speech coder or the non bit-exact speech coder, wherein the bit-exact speech coder produces a first transmit signal and the non bit-exact speech coder produces a second transmit signal;
    a signal strength detector in the mobile unit which measures the signals received by the mobile unit to determine a bit error rate of the received signal, wherein the mobile unit averages several measurements of the received signal to determine an average bit error rate; and
    a coder selector in the mobile unit which is in communication with the signal strength detector in the mobile unit, the coder selector in the mobile unit compares the average bit error rate of the received signal to a predetermined threshold to calculate whether to switch between the non bit-exact speech coder and the bit-exact speech coder based on the average bit error rate of the received signals from the signal strength detector;
    wherein the coder selector switches from the non bit-exact speech coder to the bit-exact speech coder when the average bit error rate of the received signal exceeds the predetermined threshold and the coder selector switches from the bit-exact speech coder to the non bit-exact speech coder when the average bit error rate of the received signal is below the predetermined threshold;
    wherein the non bit exact speech encoder reduces power consumption in the mobile unit; and
    wherein the second transmit signal is more degraded than the first transmit signal.

2. The wireless communication system of claim 1, wherein the coder selector may be bypassed.

3. The wireless communication system of claim 1, wherein the signal strength detector measures the estimated frame-by-frame bit error rate.

4. A method of conserving power in a wireless communication system comprising the acts of:
    measuring in a mobile unit a bit error rate of at least one signal received by the mobile unit from a base station;
    averaging in the mobile unit several measurements of the received signal to determine an average bit error rate;
    comparing in the mobile unit the average bit error rate with a predetermined threshold; and
    calculating in a mobile unit whether to switch between a bit-exact speech coder and a non bit-exact speech coder based on the average bit error rate;
    wherein the mobile unit switches from the non bit-exact speech coder to the bit-exact speech coder when the average bit error rate exceeds the predetermined threshold and switches from the bit-exact speech coder to the non bit-exact speech coder when the average bit error rate is below the predetermined threshold;
    wherein the non-bit exact speech coder is compatible with the bit-exact speech coder; and
    wherein the non bit-exact speech coder produces a lower quality signal than the bit-exact speech coder.

5. The method of claim 4, wherein the act of switching to the non bit-exact speech coder may be selectively activated.

6. The method of claim 4, wherein the non bit-exact speech coder is one of a family of speech coders which can exchange compatible data.

7. The method of claim 4, wherein the non bit-exact speech coder saves power.

8. The method of claim 4, wherein the non bit-exact speech coder reduces processor loading.

9. The method of claim 4, wherein measuring in the mobile unit the bit error rate comprises measuring an RX Quality figure of the received signal.

10. The method of claim 4, wherein measuring in the mobile unit the bit error rate comprises measuring an estimated frame-by-frame bit error rate of the received signal.

11. The method of claim 4, wherein measuring in the mobile unit the bit error rate comprises determining a parity check of the received signal.

12. A wireless communication system comprising:
    a processor usage indicator in a mobile unit which determines the loading on a processor in the mobile unit; and
    a speech coder selector in the mobile unit which is in communication with the processor usage indicator, the speech coder selector in the mobile unit compares the loading on the processor to a predetermined threshold to calculate whether to switch between a non bit-exact speech coder and a bit-exact speech coder based on the loading on the processor from the processor usage indicator;

wherein the speech coder selector switches from the bit-exact speech coder to the non bit-exact speech coder when the loading on the processor exceeds the predetermined threshold and switches from the non bit-exact speech coder to the bit-exact speech coder when the loading on the processor is below the predetermined threshold;

wherein the non bit-exact speech coder is compatible with the bit-exact speech coder; and wherein the non bit-exact speech coder is less accurate than the bit-exact speech coder.

13. The wireless communication system of claim 12, wherein the speech coder selector may be selectively activated.

14. The wireless communication system of claim 12, wherein the non bit-exact speech coder saves power.

15. The wireless communication system of claim 12, wherein the non bit-exact speech coder reduces processor loading.

16. The wireless communication system of claim 12, wherein the bit-exact speech coder and the non bit-exact speech coder are members of a family of speech coders.

17. The wireless communication system of claim 16, wherein encoded data may be decoded by a single decoder.

18. A wireless communication system comprising:
a signal strength indicator in a mobile unit which measures a signal received by the mobile unit to determine a bit error rate of the received signal, wherein the signal strength indicator averages several measurements of the received signal to determine an average bit error rate; and a speech coder selector in the mobile unit which is in communication with the signal strength detector in the mobile unit, the speech coder selector in the mobile unit compares the average bit error rate on the received signal to a predetermined threshold to calculate whether to switch between a bit-exact speech coder and a non bit-exact speech coder based on the average bit error rate of the received signal from the signal strength indicator;

wherein the speech coder selector switches from the non bit-exact speech coder to the bit-exact speech coder when the average bit error rate of the received signal exceeds the predetermined threshold and the speech coder selector switches from the bit-exact speech coder to the non bit-exact speech coder when the average bit error rate is below the predetermined threshold;

wherein the bit-exact speech coder and the non bit-exact speech coder can exchange compatible data; and wherein the non bit-exact speech coder is a lower quality speech coder than the bit-exact speech coder.

19. The wireless communication system of claim 18, wherein the speech coder selector may switch between the bit-exact speech coder and the non bit-exact speech coder each frame.

20. A wireless communication system comprising:
means for measuring in a mobile unit a bit error rate of a signal received by the mobile unit from a base station;

means for averaging in the mobile unit several measurements of the received signal to determine an average bit error rate;

means for comparing in the mobile unit the average bit error rate with a predetermined value; and means for calculating in the mobile unit whether to switch between a bit-exact speech coder and a non bit-exact speech coder based on the average bit error rate;

wherein the mobile unit switches from the non bit-exact speech coder to the bit-exact speech coder when the average bit error rate exceeds the predetermined value and switches from the bit-exact speech coder to the non bit-exact speech coder when the average bit error rate is below the predetermined value;

wherein the non bit-exact speech coder is compatible with the bit-exact speech coder; and wherein the non bit-exact speech coder is a lower quality speech coder than the bit-exact speech coder.

21. The wireless communication system of claim 20, wherein the non bit-exact speech coder consumes less power than the bit-exact speech coder.

22. The wireless communication system of claim 20, wherein the switching is software controlled.

23. The wireless communication system of claim 20, wherein the predetermined value may be dynamically adjusted.

24. A wireless communication system comprising:
means for determining in a mobile unit the loading on a processor in the mobile unit; and means for comparing in the mobile unit which is in communication with the means for determining, the means for comparing compares the loading on the processor to a predetermined threshold to calculate whether to switch between a non bit-exact speech coder and a bit-exact speech coder based on the loading on the processor;

wherein the means for comparing switches from the bit-exact speech coder to the non bit-exact speech coder when the loading on the processor exceeds the predetermined threshold and switches from the non bit-exact speech coder to the bit-exact speech coder when the loading on the processor is less than the predetermined threshold;

wherein the non bit-exact speech coder is compatible with the bit-exact speech coder; and wherein the non bit-exact speech coder is a lower quality speech coder than the bit-exact speech coder.

25. The wireless communication system of claim 24, wherein the switching may be selectively disabled.

26. The wireless communication system of claim 24, wherein the bit-exact speech coder and the non bit-exact speech coder are members of a family of speech coders which can exchange compatible data.

* * * * *

UNITED STATES PATENT AND TRADEMARK OFFICE
CERTIFICATE OF CORRECTION

PATENT NO.        : 7,047,185 B1                                          Page 1 of 1
APPLICATION NO.   : 09/153631
DATED             : May 16, 2006
INVENTOR(S)       : Karim Younes et al.

It is certified that error appears in the above-identified patent and that said Letters Patent is hereby corrected as shown below:

At Column 9, Line 66, In Claim 1, delete "signals" and insert --signal--, therefor.

Signed and Sealed this

Ninth Day of January, 2007

JON W. DUDAS
*Director of the United States Patent and Trademark Office*